United States Patent Office 2,859,320
Patented Nov. 4, 1958

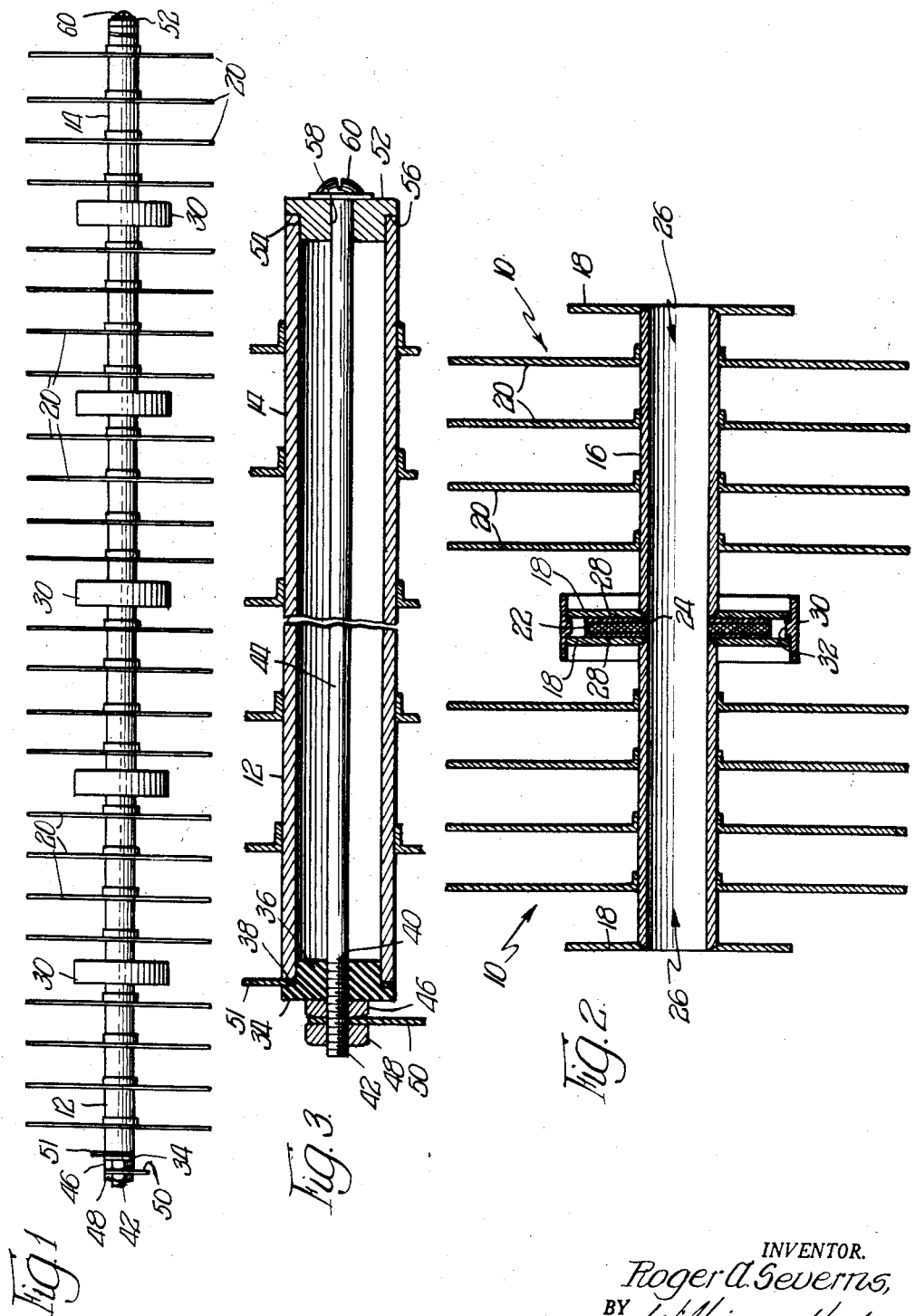

2,859,320

VARIABLE RESISTANCE APPARATUS FOR MEASURING FLUID TEMPERATURES

Roger A. Severns, Mount Prospect, Ill., assignor to The Powers Regulator Company, Skokie, Ill., a corporation of Illinois Application July 26, 1956, Serial No. 600,200

4 Claims. (Cl. 201—63)

This invention relates to a variable resistance apparatus for measuring fluid temperatures, and more particularly to a thermally responsive, variable resistance assembly for use in the measurement of the temperature of fluid mediums.

Accurate measurement of the temperature of flowing fluid mediums is sometimes difficult if the volume of flow is relatively large. For example, a problem is often encountered in accurately measuring the temperature of a large air mass flowing in a conduit of relatively large cross-sectional area. Likewise, if the temperature is to be taken within a conduit having a rather irregular configuration, it is quite possible that restricted local areas within the conduit will have a temperature which differs from the average temperature of the entire air mass. Since this latter reading is that which is normally sought, it is desirable to have means available that will give an indication of the average temperature rather than that of a restricted area or location.

It is therefore an object of this invention to provide a thermally responsive, variable resistance assembly which will provide an accurate indication of the temperature of a large mass of moving fluid medium.

A further object of the invention is to provide apparatus of the character described which will give an indication substantially unaffected by local variations in the temperature of the medium, and which will furnish an average reading for the entire fluid flow.

Still another object of the invention is to provide apparatus of the character described which is of relatively simple construction and which, therefore, is inexpensive to manufacture and which also requires a minimum of maintenance.

Further objects and advantages of this invention will become evident as the description proceeds and from an examination of the accompanying drawing, which illustrates one embodiment of the invention and in which similar numerals refer to similar parts through the several views.

In the drawings—

Fig. 1 is a side view in elevation of one form of apparatus embodying the invention.

Fig. 2 is an enlarged view in vertical cross-section of a pair of adjacent segments of the apparatus shown in Fig. 1; and Fig. 3 is an enlarged view in vertical cross-section of two fragmentary portions of the apparatus shown in Fig. 1, illustrating the structure of the end portions thereof in more detail.

Referring now to Fig. 1, one form of a variable resistance apparatus incorporating the invention is shown therein. The apparatus has an elongated configuration and is made up of a plurality of individual segments, as best shown in Fig. 2 and indicated generally by the numeral 10. These segments may be identical except possibly for the two end segments 12 and 14, best shown in Fig. 3. The intermediate segments 10 are made of electrically and thermally conducting material and have a tubular body 16 which is provided with an annular end flange 18 at each end thereof. The two end segments 12 and 14 are here shown as not having the end flanges 18, although for purposes of standardization such flanges could be provided. Intermediate the two flanges 18 are a plurality of heat exchange surfaces 20 which preferably are in the form of annular discs or fins formed of high heat conducting material. These fins 20 are disposed in secured relation to the tubular body portion 16 in spaced planes normal to the longitudinal axis of said body portion.

As best shown in Fig. 1, a plurality of the segments 10 are disposed in a longitudinally aligned row, with adjacent ends thereof in juxtaposed relation. A thermally responsive resistance member 22, which may be in the form of a thermistor, is disposed between each pair of adjacent flanges 18 and has a central opening 24 aligned with the hollow interior 26 of the tubular member 16. To insure good electrical contact between the thermistor 22 and the flanges 18, lead washers 28 may be disposed on each side of the thermistor 22 so as to form spacer elements between the flanges 18 and the two sides of the thermistor 24.

An annular cover 30 may be disposed on the outer periphery of the adjacent flanges 18, as best shown in Fig. 2. This cover is substantially cylindrical in form and is provided with an internally projecting shoulder 32 which is normally disposed between the adjacent flanges 18 and serves to maintain the cover or sleeve 30 in the desired position. This cover 30 may be made of relatively flexible, electrically insulating material so that it can be snapped in place after the assembly of the components with which it is associated have been completed.

As shown in Fig. 1, the two end segments 12 and 14 are similarly disposed in longitudinal alignment with the remaining segments 10, but may or may not have a flange 18 provided at their outer extremities. In either case, the end segment 12 has associated therewith an insulating washer 34 which is preferably provided with a portion 36 of reduced diameter, which is adapted to be received within the bore 26 of the tubular member 16. The outer extremity of the end segment 12 therefore normally abuts the shoulder 38 formed between the portion of reduced diameter 36 and the remaining portion of the washer 34.

A central bore 40 is provided in the washer, which is adapted to receive the threaded end 42 of the rod member 44 extending the full length of the entire assembly. Suitable lock nuts 46 and 48 are adapted to be threadedly received on the end 42 of the rod 44, and an electrical connector 50 may be conveniently disposed between the lock nut 46 and the washer 34. Similarly, a connector 51 may be disposed between the outer extremity of the segment 18 and the washer 34.

The other end segment 14 has a washer 52 formed of electrically conducting material disposed in association therewith in substantially the same fashion as the washer 34 is associated with the end segment 12. The washer 52 has an area of reduced diameter 54 forming a shoulder 56 against which the outer extremity of the end segment 14 is adapted to abut. Likewise, a central bore 58 is formed in the washer 52 which is adapted to receive the opposite end 60 of the rod 44, which end may be in the form of a screw head.

With this construction, if the segments 10, 12, and 14 making up the assembly are formed of electrically and thermally conductive material, a continuous electrical circuit is established between the connectors 50 and 51. This, of course, means that all of the thermistors 22 are disposed in series in such a circuit and, therefore, have a cumulative effect on the resistance of the circuit. The end result is that even if the temperature of the fluid medium varies slightly in different areas with which the apparatus is associated, the total resistance of the electrical circuit will be proportioned to the average temperature of the medium. As mentioned above, this is a desirable result, particularly where circuits of relatively large cross-section or of unusual configuration are involved.

Obviously, the length of the assembly can be varied to suit the particular installation, and likewise the dimensions of the individual segments can be varied. The number and disposition of the heat exchange surfaces 20 can be arranged to give the best results in any particular environment. Also, the tubular members 16 and the flange members 18 should have as low electrical resistance as possible so that the thermistors 22 make up the major portion of the resistance of the circuit.

The form of the resistance apparatus described is particularly adapted to be disposed transversely of a conduit for a fluid medium. Since it is generally elongated, it can be mounted at one end so as to project into the interior of the conduit. As both of the electrical leads to the apparatus can be connected at one end, this end can be mounted so as to project slightly from the conduit, with the main body disposed on the interior thereof. It is conceivable that in some installations it will be desirable to have the apparatus extend completely across the interior of such a conduit, and in such instances an electrical connection would be made at each end. Likewise, if it were desirable to do so, the two ends of the apparatus could be made to project from opposite sides of the conduit. The elongated form of the apparatus also insures that a temperature sampling is taken over an extended area which prevents the undesirable results of localized sampling previously mentioned.

In the drawing and specification, there has been set forth a preferred embodiment of the invention, and although specific terms are employed, they are used in a generic and descriptive sense only and not for purposes of limitation. Changes in form and in the proportion of parts, as well as the substitution of equivalents are contemplated, as circumstances may suggest or render expedient, without departing from the spirit or scope of this invention as further defined in the following claims.

What is claimed is:

1. A thermally responsive, variable resistance assembly for use in apparatus for measuring fluid temperatures, comprising a plurality of hollow, elongated members formed of thermally and electrically conducting material, means formed of electrically conductive material for clamping said elongated members in axial alignment, with adjacent ends in juxtaposed relation to form an aligned row of said members, said means being disposed in electrical contact with one end of said row of said members and being insulated electrically from the other end of said row of said members, means for making separate electrical connection with said other end and with said clamping means, and a thermistor disposed between and in electrical contact with said juxtaposed ends of said elongated members.

2. A thermally responsive, variable resistance assembly for use in apparatus for measuring fluid temperatures, comprising a plurality of elongated, hollow members formed of thermally and electrically conducting material and disposed in axial alignment, an electrically conducting rod extending through said hollow members and secured at one end thereof in electrical contact therewith, means for securing the opposite end of said rod in electrically insulated relation to the opposite end of said row of hollow members so as to clamp said hollow members in axial alignment with adjacent ends in juxtaposed relation, means for making a separate electrical connection to said opposite end of said row of hollow members and to said opposite end of said rod, a thermistor disposed between and in electrical contact with said juxtaposed ends of said elongated members, and a plurality of spaced heat exchange surfaces extending outwardly from said elongated members.

3. A thermally responsive, variable resistance assembly for use in apparatus for measuring fluid temperatures, comprising a plurality of hollow tubular members formed of thermally and electrically conducting material and disposed in axial alignment, an electrically conducting rod extending through said hollow members and secured at one end thereof in electrical contact therewith, means for securing the opposite end of said rod in electrically insulated relation to the opposite end of said row of hollow members so as to clamp said hollow members in axial alignment with adjacent ends in juxtaposed relation, means for making a separate electrical connection to said opposite end of said row of hollow members and to said opposite end of said rod, an annular flange member secured to the juxtaposed ends of said tubular members, an annular thermistor disposed between and in electrical contact with adjacent flange members, and a plurality of spaced heat exchange surfaces extending outwardly from said elongated members.

4. A thermally responsive, variable resistance assembly for use in apparatus for measuring fluid temperatures, comprising a plurality of hollow members formed of thermally and electrically conducting material and disposed in axial alignment and electrically conducting rod extending through said hollow members and secured at one end thereof in electrical contact therewith, means for securing the opposite end of said rod in electrically insulated relation to the opposite end of said row of hollow members, so as to clamp said hollow members in axial alignment with adjacent ends in juxtaposed relation, means for making a separate electrical connection to said opposite end of said row of said hollow members and to said opposite end of said rod, said elongated members being provided with a flange member at their ends, a thermistor disposed between adjacent flange members, said thermistor and said flange members being in thermally and electrically conducting relationship, annular means encompassing said flange members, and a plurality of spaced heat exchange sudfaces extending outwardly from said elongated members.

References Cited in the file of this patent
UNITED STATES PATENTS 2,067,604   Godsey _____ Jan. 12, 1937